United States Patent [19]

Winslow

[11] 4,374,883

[45] Feb. 22, 1983

[54] PRESSURE-SENSITIVE ADHESIVE TAPE

[75] Inventor: Louis E. Winslow, Stillwater, Minn.

[73] Assignee: Minnesota Mining and Manufacturing Company, St. Paul, Minn.

[21] Appl. No.: 311,553

[22] Filed: Oct. 15, 1981

[51] Int. Cl.³ .................. B32B 7/02; B32B 27/40; D21H 1/04

[52] U.S. Cl. ................... 428/40; 428/212; 428/214; 428/217; 428/343; 428/352; 428/354; 428/423.1; 428/423.7; 428/425.1; 428/480; 428/537; 428/913; 428/914

[58] Field of Search ............ 428/214, 212, 343, 217, 428/40, 41, 354, 355, 914, 353, 352, 423.1, 423.7, 425.1, 480, 537, 913; 128/156

[56] References Cited

U.S. PATENT DOCUMENTS

| | | | |
|---|---|---|---|
| 997,125 | 7/1911 | Gleason | 428/212 |
| 2,652,351 | 9/1953 | Gerhardt | 428/355 |
| 3,161,533 | 12/1964 | Gaynes | 428/914 X |
| 3,340,088 | 9/1967 | Pennisi et al. | 428/353 |
| 3,811,438 | 5/1974 | Economou | 128/156 |
| 3,812,005 | 5/1974 | Katagiri et al. | 428/40 |
| 3,885,559 | 5/1975 | Economou | 128/156 |
| 4,112,177 | 9/1978 | Salditt et al. | 428/355 X |
| 4,260,659 | 4/1981 | Gobran | 428/354 X |

*Primary Examiner*—Thomas J. Herbert, Jr.
*Attorney, Agent, or Firm*—Cruzan Alexander; Donald M. Sell; Richard E. Brink

[57] ABSTRACT

Normally tacky and pressure-sensitive adhesive tape, having a composite adhesive stratum made of 2 or more separate layers in which the tape synergistically exhibits properties superior to those of a tape made with either component layer alone. One layer is a polyurethane having some adhesive properties but lacking true pressure-sensitivity. The exposed surface of the stratum is a conventional pressure-sensitive adhesive. Numerical criteria are specified for each layer.

7 Claims, No Drawings

PRESSURE-SENSITIVE ADHESIVE TAPE

BACKGROUND OF THE INVENTION

This invention relates to normally tacky and pressure-sensitive adhesive tape, especially tape products having excellent shear and adhesion properties. Preferred embodiments of the invention include general purpose masking tapes and adhesive transfer tapes.

For over half a century normally tacky and pressure-sensitive adhesive tape has been widely used throughout the world for a variety of masking, holding, binding, protecting, sealing, marking, and other purposes. In its simplest form, such tape comprises a sheet backing to one face of which is adhered a coating of normally tacky and pressure-sensitive adhesive, a composition which possesses a four-fold balance of adhesion, cohesion, stretchiness and elasticity. This balance is achieved when the adhesive possesses a suitable combination of both viscous and elastic properties. Pressure-sensitive adhesives are discussed extensively in Chapter 17 of Houwink and Salomon, *Adhesion and Adhesives*, Vol. 2, Elsevier Publishing Company, Amsterdam, Netherlands, 1967.

General purpose pressure-sensitive adhesive tapes have almost always employed a rubber-resin functional adhesive, which may be coated from solution or emulsion, applied as a hot melt, or polymerized in situ. For applications where optical clarity or adhesive bond longevity is required, acrylic or silicone pressure-sensitive adhesives are used, their relatively higher cost precluding general use.

In searching for an alternative to rubber-resin for general purpose pressure-sensitive adhesives, a great deal of attention has been paid to polyurethane chemistry, and many patents on nominally pressure-sensitive polyurethane-based adhesives have issued over the last quarter century. Polyurethanes can be readily formed from raw materials which are themselves comparatively inexpensive; combinations of diols and triols can be reacted with diisocyanates to obtain a wide spectrum of elastomeric products having excellent internal strength and heat resistance, as well as some of the rheological properties of pressure-sensitive adhesives. Since the present cost of polyurethane-based adhesives is approximately half that of either rubber-resin or acrylic adhesives, it would be expected that they would be in widespread use today. Such, however, is not the case, for tapes utilizing polyurethane-based adhesives have been found suitable for only a few specialized uses.

A pressure-sensitive adhesive must possess some degree of elastic compliance and viscous flow, enabling it to relieve the stresses to which it is subjected to in use; see "Pressure-Sensitive Adhesives" in "Treatise on Adhesion and Adhesives", Vol. 2, "Materials," R. I. Patrick, Ed., Marcel Dekker, Inc. New York, 1969 and Chapter 1 in "Viscoelastic Properties of Polymers", John D. Ferry, 3$^d$ Edition, John Wiley & Sons, New York, N.Y., 1980.

When tested in shear, a true pressure-sensitive adhesive exhibits both elastic (recoverable) deformation and viscous (non-recoverable) deformation. These materials can be described mathematically from compliance data generated from shear creep experiments as $\gamma_T = \sigma_o J_e^o + \sigma_o t/\eta$ (where t=time, $J_e^o$=elastic deformation, $\sigma_o$=stress, $\eta$=viscosity, and $\gamma$=strain. In this mathematical description, the term $\sigma_o J_e^o$ reflects the elastic or the recoverable energy of deformation in a shear mode, while the term $\sigma_o \tau/\eta$ reflects the viscous component, or non-recoverable energy. Typically the viscous component represents about 25% of non-recoverable deformation, although this value is not limiting in terms of the non-recoverable deformation of pressure-sensitive adhesives.

Polyurethane-based adhesives, however, do not seem to possess these same characteristics, functioning either like weak rubber bands or simply as high viscosity liquids. The former adhesives possess no viscous component but exhibit both elastic and delayed elastic deformation. They continue to elongate when subjected to a stretching force but return to essentially their original dimensions after the stretching force is removed; i.e., they are elastic. The less the degree of crosslinking, the greater the delayed elastic response. When such a soft polyurethane is stressed, shear deformation can continue to occur over an extended period, which may give the appearance—but not have the actual physical characteristics—of viscous flow. Thus, these materials possess no viscous component and are mathematically described by $\gamma_T = \sigma_o J_e$, in which case $J_e$ contains the components of both elastic and delayed elastic deformation. Tapes made with such adhesives are deficient for general purpose use, since they tend to fail by gradually peeling away from surfaces to which they have been applied.

High viscosity polyurethanes are typically obtained by using a substantial excess of polyol. When viscous flow is attained in this manner, the adhesive at least partially transfers to the surface to which it is applied, leaving a deposit upon removal, and its cohesive strength is too low to withstand the stresses applied in normal uses. These materials are also mathematically described by the equation $\gamma_T = \sigma_o J_e^o + \tau_o t/\eta$, but in this case, the second term, $\sigma_o t/\eta$, dominates the equation.

It is primarily for the rheological reasons just discussed that, in spite of their attractive cost, polyurethane "pressure-sensitive" adhesives have not enjoyed much success in the marketplace. It has not been possible to achieve the requisite balance between viscosity and elasticity with polyurethane chemistry; the resulting adhesives are unacceptable for most pressure-sensitive adhesive applications, even though they possess rheological properties found in many pressure-sensitive adhesives.

It is obvious from the preceding discussion that it is possible to describe and distinguish among similar or different viscoelastic materials. From shear creep measurements, the compliance, J, is directly obtained. Thus $$J_t = \frac{\gamma_t}{\sigma_o} = J_e^o + 1/\eta t.$$

Note that a plot of the above equation yields a straight line having a slope of $1/\eta$ (the viscous component) and an intercept of $J_e^o$ (the elastic component).

Over the years, some tape or tape-like products have been made (usually for very specific end uses) incorporating two or more consecutively applied layers of adhesive. For example, note the following U.S. Pat. Nos.: 997,125, which shows a fabric coated with two non-tacky adhesive layers, the outer layer having a lower melting point than the inner; U.S. Pat. No. 2,652,351, which describes a tape having two coatings of apparently identical pressure-sensitive adhesive; U.S. Pat.

No. 3,161,533, which discloses a pressure-sensitive adhesive tape in which two silicone pressure-sensitive adhesives, differing in filler content, are consecutively coated on a backing; U.S. Pat. No. 3,340,088, which teaches the consecutive coating of a thin, tacky rubber-resin primer and a low-tack rubber-resin pressure-sensitive adhesive; U.S. Pat. Nos. 3,811,438 and 3,885,559, which describes adhesive tapes in which the backing is first completely coated with one pressure-sensitive adhesive and then strip-coated with a somewhat more aggressive pressure-sensitive adhesive; U.S. Pat. No. 3,812,005, which discloses a base sheet consecutively coated with an adhesive and a "self-sticking layer".

U.S. Pat. Nos. 4,112,177 and 4,260,659 disclose tape in which one pressure-sensitive adhesive coating is overcoated with a second pressure-sensitive adhesive coating. In each case, the first pressure-sensitive adhesive possesses an essential property in which the second adhesive is deficient. In each case, this essential property (respectively shear and porosity) is much lower in the final composite construction than it is in the first coat, reflecting a compromise between the properties of the two adhesive systems. In both cases the overcoated top adhesive must be more compliant than the bottom coat to achieve desired performance levels.

Much of the preceding discussion, mutatis mutandis, is applicable to adhesive transfer tapes. In such products the backing on which the adhesive is coated is a release liner; in typical use, the exposed adhesive surface is placed in contact with a first substrate to which it is to be permanently bonded, after which the release liner is stripped away and a second substrate permanently bonded to the newly exposed adhesive surface.

BRIEF SUMMARY

The present invention provides novel pressure-sensitive adhesive tape products for general purpose use. These products have excellent conformability, good peel and shear resistance, good holding power, resistance to aging, and comparatively low raw material costs.

The tape comprises a sheet backing to which is adhered a rubbery, compliant polyurethane layer. Applied over the polyurethane layer, so as to constitute the outermost surface of the adhesive, is a layer of normally tacky and pressure-sensitive adhesive. This adhesive (termed "functional" because it contacts the substrate to which the tape is applied) is desirably of a type which adheres readily to many substrates but need not possess especially good shear or peel adhesion properties.

As will be seen, the invention employs two consecutively applied coatings to achieve a synergistic effect rather than a compromise in adhesive properties. It is also of interest to note that in no instance of prior art composite adhesive constructions is it taught or even suggested to employ polyurethane adhesives in spite of their long history.

Stated succinctly, the invention is embodied in normally tacky and pressure-sensitive adhesive tape having good holding power, resistance to aging and comparatively low cost comprising a sheet backing bearing a composite adhesive stratum comprising a layer of rubbery, compliant polyurethane and, bonded over the polyurethane layer so as to constitute the outermost surface, a layer of soft, normally tacky and pressure-sensitive adhesive which is immiscible with the polyurethane, the thickness of the polyurethane layer being at least about twice the thickness of the pressure-sensitive adhesive layer, said tape exhibiting superior adhesive properties to those attainable with tape in which the backing is coated with either the polyurethane alone or the pressure-sensitive adhesive alone.

The combined thickness of the composite adhesive stratum (i.e., the total thickness of the polyurethane and pressure-sensitive adhesive layers) is somewhat dependent on both the nature of the tape and the smoothness of the backing. Thus, for example, the total thickness should be at least about 35 micrometers for masking tape having a smooth polyester film backing, perhaps twice that thickness being necessary when the backing is an irregular-surfaced saturated creped paper. Generally speaking, the thickness of the pressure-sensitive adhesive layer should not exceed that of the polyurethane layer; preferably, the polyurethane:pressure-sensitive adhesive thickness ratio is at least 2:1, and more preferably at least 4:1.

The polyurethane and pressure-sensitive adhesive layers are conveniently characterized by means of certain rheological tests which are described more fully hereinafter. The polyurethane, for example, should have a 10-second shear creep compliance of at least $5 \times 10^{-6}$ cm$^2$/dyne, a 7–10 minute elastic compliance component of at least 50%, a 7–10 minute shear rate viscosity of at least $10^6$ Pa.s and an equilibrium elastic compliance component of greater than 90%. The functional pressure-sensitive adhesive should have a 10-second shear creep compliance of at least $1.6 \times 10^{-6}$ cm$^2$/dyne, an elastic compliance component of greater than 50% and a 7–10 minute shear rate viscosity of at least $3 \times 10^6$ Pa.s. If the polyurethane conforms to these rheological criteria, a wide range of both crosslink densities and urethane group concentrations is acceptable.

DETAILED DESCRIPTION

As an aid to understanding the invention, rheological tests for the adhesives and performance tests for tape products will now be discussed.

Turning first to the test procedures which are useful in characterizing the polyurethane and the functional pressure-sensitive adhesive, attention is directed to the following tests, all of which were performed after conditioning at 50% relative humidity and 22° C.: *Shear-Creep Compliance Test*. In Chapter II, Section 6, of *Properties and Structure of Polymers*, John Wiley & Sons, Inc., New York, NY, 1960, Tobolsky discusses the five regions of viscoelastic behavior possessed by linear amorphous polymers, e.g., polystyrene. He characterizes the elastic properties of a polymer by its tensile relaxation modulus, E (t), which is obtained by measuring stress as a function of time in a sample maintained at constant extension and constant temperature. As a polymer is heated, it successively passes through regions which can be designated as glassy, transition, rubbery flow, and liquid flow. Only the latter two regions are of significance to the present invention. For a 10-second reference time, the dividing line between the rubbery plateau and the rubbery flow regions E (10), is approximately $2.5 \times 10^6$ dynes/cm$^2$. In the rubbery flow region, the shear modulus, G' (10), is approximately one-third the tensile modulus, or $0.83 \times 10^6$ dynes/cm$^2$. The shear creep compliance J (10), which is the reciprocal of the shear modulus, is thus $1.2 \times 10^{-6}$ cm$^2$/dyne at the boundary between the rubbery plateau and the rubbery flow regions.

In measuring shear-creep compliance, a 500-micrometer thickness of the material to be tested is knife-coated onto a smooth film of polytetrafluoroethylene. To measure the shear-creep compliance of the composite constructions, compliant rubbery polyurethane layers which have been coated and cured on polytetrafluoroethylene are then overcoated with the functional adhesive using a freely rotating wire wound rod, or Mayer bar (cf. U.S. Pat. No. 1,043,021). The functional adhesives are then dried by placing the samples in an air circulating oven for 2 minutes at 107° C. The layer (or layers) is then stripped from the polytetrafluoroethylene. Two test pieces of equal area are die-cut and placed in a parallel plate shear-creep plastometer, one piece being on each side of the center plate, with an outer plate contacting the exposed surface of each. Screws connecting the two outer plates are then tightened so as to compress the interposed layers approximately 10%. The parallel plates are placed in horizontal arrangement and one end of the center plate connected to a chart recorder. A hook is attached to the opposite end of the center plate, with a flexible wire extending horizontally from the hook and then downward over a pulley, the outer plates being held in a fixed position. A suitable weight (one which is sufficient to measurably deform the sample a distance no greater than its thickness) is attached to the free end of the wire, and the chart recorder started. The weight is typically 20–1500 grams, preferably about 500 grams. From the chart recorder the time and displacement (strain) are read and the applied force (stress) recorded; the shear creep compliance, $J$, the elastic component, $J_e$, and the viscosity, $\eta$, are then calculated, using the equation $$\frac{\text{strain}}{\text{stress}} = J_{(t)} = J_e^o + \frac{1}{\eta} t$$

discussed in the preceding section.

SHEAR TEST

A 75-micrometer layer of polyurethane, pressure-sensitive adhesive, or polyurethane followed by pressure-sensitive adhesive, is coated onto polyurethane-saturated crepe paper sheet or polyester film to form a tape product. A 1.25-centimeter wide strip of the tape is placed with the coated side contacting a stainless steel plate which is maintained 2° off vertical (to prevent peeling of the tape away from the steel substrate), so that the tape and plate overlap by 1.25 centimeters, resulting in a contact area 1.25 cm×1.25 cm. The tape is pressed into contact with the steel substrate by passing a hard rubber roller weighing 2.1 kg over this contacting area at about 3.8 cm per second, and the bond is then tensioned by hanging a 1000-gram weight from the free end of the tape. The time required for the tape to separate from the steel plate is measured and recorded as the shear strength of the adhesive. In addition, the mode of failure is recorded, the following abbreviations being used: C=cohesive failure, meaning that the adhesive split, leaving essentially equal residues on both the tape backing and the substrate after the failure; P=pop-off failure, indicating that the adhesive peeled cleanly from the substrate, leaving no residue; C/P=cohesive/-pop-off, indicating that the adhesive failed partially in each manner, leaving some areas of adhesive residue on both the substrate and the backing but at the same time leaving other areas clean of residue.

BOX HOLDING TEST

This test provides a composite evaluation of both adhesive strength and peel adhesion resistance. A fiberboard box designed for heavy duty packaging is obtained, the accepted designation being as follows: regular slotted construction (RSC), dimensions 6¾"×6¾"×3⅛" (171.5 mm×171.5 mm×79.4 mm), constructed of 200-lb. (338 g/m$^2$) C-flute fiberboard. A sample of the test tape 1.25 cm×7.6 cm is applied to the folded box flaps across the gap, and rubbed lightly with fingertip pressure to ensure adhesion. The box flaps are then released, stressing the adhesive tape bond, and failure is deemed to have occurred if and when the box opens or the tape slips more than 0.5 mm. Failure time and mode are recorded.

PAINT PANEL REMOVABILITY TEST

Strips of paper-backed tape approximately 2.5 cm wide are adhered to the surface of a steel panel which has been provided with a coating of acrylic automobile enamel (e.g., duPont 963-AM-157). The resulting laminate is then placed in a circulating air oven maintained at approximately 95° C. for 30 minutes. The tape is then immediately stripped from the enamel surface, failure being deemed to have occurred if any of the adhesive transfers thereto.

Understanding of the invention will be further aided by referring to the following illustrative but nonlimitative examples, in which all parts are by weight unless otherwise noted.

A compliant rubbery polyurethane material was prepared by first weighing into a 100-ml tri-pour plastic beaker, 10 grams of polypropylene oxide triol having a hydroxy equivalent weight of 870 and 15 grams of polypropylene oxide diol having a hydroxy equivalent weight of 1500. Next, 0.29 gram of a 30% solution of $SnCl_2.2H_2O$ in polypropylene glycol (1000 equivalent weight) was added, along with 0.18 gram of 3,4-epoxy-cyclohexylmethyl-3,4 epoxy cyclohexane carboxylate, these last two ingredients reacting to form a polymerization catalyst. To the polyol-catalyst mixture was then added 3.78 grams of isocyanate prepolymer obtained by reacting 2,4-toluene-diisocyanate, polypropylene glycol (equivalent weight 1000) and tripropylene glycol to give an NCO:OH equivalent ratio of 1.0. The several components were then mixed for two minutes, knife-coated onto either saturated crepe paper or polyester film backing and cured for 90 seconds at approximately 150° C. The polyurethane prepared in this manner is identified in the tables below as formulation "B". Two other polyurethanes were prepared from the same starting materials, varying the polyol:isocyanate prepolymer ratio to obtain NCO:OH ratios of 0.88 (Formulation "F") and 1.12 (Formulation "G") and similarly coated on a film or paper-backing.

Polyurethane formulations A, C, D, E, H and I were prepared in the same manner as formulation B, the amount of the isocyanate prepolymer being adjusted to give an NCO:OH ratio of 1.0 in all cases but the diol:-triol ratio being varied to achieve the desired molecular weight between crosslinks.

Polyurethanes A-I were evaluated using the tests previously described. For comparative purposes a natural rubber (NR) and a random styrene:butadiene copolymer rubber (SBR) were subjected to the same tests. Tape products were then prepared by coating the polyurethane on either (a) 115-micrometer crepe paper saturated with 37 g/m$^2$ polyurethane (cf. U.S. Pat. No. 3,248,254) or (b) 38-micrometer biaxially oriented polyethylene terephthalate (polyester) film. The tapes were then subjected to the tests previously described. Results, summarized in Table 1 below, demonstrate that no product performed satisfactorily for general tape use.

Adhesive characteristics and tape performance data are presented in Table II.

TABLE II

Conventional Pressure-Sensitive Adhesives

| | | | Adhesive Characteristics | | | | Tape Performance | | | |
|---|---|---|---|---|---|---|---|---|---|---|
| Lot | Form in which applied | Type | 10-Second Shear Creep Compliance, cm²/dyne × 10⁻⁶ | Shear Rate Viscosity Pa.s × 10⁶ | 7–10 Minutes Elastic Compliance Component, Percent | Shear Minutes | | Box Holding | | Paint Panel Removability |
| | | | | | | Saturated Paper Backing | Polyester Film Backing | Time, Hours | Type of Failure | |
| K | aqueous emulsion, 45% solids | 96.5:3.5 IOA:AA copolymer (Inherent viscosity in ethyl acetate at 25° C. = 1.4) | 22.9 | 4.1 | 72 | 48 | 180 | 96 | C | Fail |
| L | solvent 20% solids | 100:75 NR:TP | 12.8 | 15.6 | 76 | — | 2,611 | 48 | C | — |
| M | solvent 20% solids | 100:80 NR:PIN | 5.6 | 4.9 | 52 | 8 | 20 | 0.5 | C | Fail |
| N | solvent 30% solids | 100:1 SIL:DCBP | 1.6 | 31.8 | 66 | 28 | 500 | 316 | C | — |

*Calculated from shear creep deformation using data from the seventh to tenth minutes.

TABLE I

Polyurethane Layer

| | | Polyurethane Layer Characteristics | | | | | | Tape Performance | | | |
|---|---|---|---|---|---|---|---|---|---|---|---|
| Lot | NCO/OH | Urethane Equivalents per 1000 gms | Calculated Average Molecular Weight between Cross-links+ | 10-Second Shear Creep Compliance cm²/dyne × 10⁻⁶ | Shear Rate Viscosity, Pa.s × 10⁶* | Percent Elastic Compliance Component* | Percent Elastic Compliance Component at Equilibrium | Shear Minutes | | Box Holding | |
| | | | | | | | | Paper Backing, Minutes | Polyester Film Backing, Minutes | Time, Hours | Type of Failure |
| A | 1.0 | 1.09 | 3,388 | 3.3 | 1470 | 98.5 | 100 | 0.8 | >1,000 | 0 | P |
| B | 1.0 | 1.00 | 3,008 | 5.2 | 456 | 97.2 | 99 | 5.8 | >1,000 | 0.01 | P |
| C | 1.0 | 0.90 | 9,869 | 6.0 | 50.5 | 87.5 | 98 | 3.2 | 29 | 0.33 | P |
| D | 1.0 | 0.87 | 13,108 | 18.8 | 4.6 | 76.0 | 93 | 6.9 | 15 | 0.5 | P |
| E | 1.0 | 0.87 | 14,549 | 22.3 | 1.1 | 56.6 | 94 | 17.0 | 19 | 0.33 | P |
| F | 1.12 | 1.11 | 4,200 | 5.1 | 1500 | 99.2 | 100 | | | | |
| G | 0.88 | 0.9 | 5,600 | 16.3 | 67 | 95.7 | 96 | | | | |
| H | 1.0 | 0.83 | 49,000 | 26 | 0.8 | 45 | 57 | 0.25 | 2.5 | 0 | C |
| I | 1.0 | 0.81 | — | Liquid | 0.03 | Liquid | Liquid | 0.05 | 0.05 | 0 | C |
| Comparison 1 | — | NR | — | 1.3 | 84 | 70.4 | 70.4 | — | >1,000 | 0 | P |
| Comparison 2 | — | SBR | — | 3.1 | 22.8 | 72.0 | 72.0 | 0.1 | 8.4 | 0 | P |

*Calculated from shear creep deformation using data from the seventh to tenth minutes.
+See U.S. Pat. No. 3,718,712, Col. 2, lines 11–16.

Following substantially the procedure just described, both saturated paper and polyester film backing were coated directly with each of several functional pressure-sensitive adhesives and dried or cured to leave an adhesive thickness of approximately 34–47 micrometers. The following abbreviations are employed in connection with the adhesives:

| AA | acrylic acid |
|---|---|
| IOA | isooctyl acrylate |
| TP | terpene phenolic tackifying resin ("Piccofyn" A-115, softening point 115° C., available from Hercules Inc.) |
| SIL | Polydimethyl siloxane gum tackified with dimethyl silicone resin (Dow Corning 284 silicone adhesive) |
| DCDP | 2,4-dichlorobenzoyl peroxide |
| PIN | β-pinene tackifying resin ("Piccolyte" S-115, available from Hercules Inc.) | because the pressure-sensitive adhesive layer split during removal, i.e., failed cohesively.

Various types of functional pressure-sensitive adhesives shown in Table II were applied over the polyurethane layer of each tape shown in Table I, using a Mayer bar to meter the coating. Depending on its nature, the adhesive was thereafter dried or cured to yield a thickness of approximately 9–13 micrometers. The same adhesive tests and tape tests previously described were now performed on the finished composite product, results being shown in Table III.

Likewise, when considered in the light of the data shown in Tables I and II, Table III demonstrates the synergistic effect observed with the composite construction, in which improved performance is observed over tapes made with either the polyurethanes alone or the functional adhesives alone. It is frankly not understood why this should be true, and it is indeed surprising that two coatings, each unsatisfactory in its own right, can be combined to obtain a product having such outstanding performance characteristics.

TABLE III

Comparison of Tapes Of Two-Layer (Functional Pressure-Sensitive Adhesives Over Polyurethane Layer) Construction

| Example | Base Coat Layer | Functional Adhesive Layer | Shear, Minutes Saturated Paper Backing | Shear, Minutes Polyester Film Backing | Box Holding Time, Hours | Box Holding Type of Failure | Paint Panel Removability |
|---|---|---|---|---|---|---|---|
| Comparison 3 | A | K | >300 | >1,000 | 0 | P | Fail |
| 1 | B | K | >300 | 421 | >1500 | | Fail |
| 2 | C | K | >2000 | 457 | >1500 | | Pass |
| 3 | D | K | >1800 | 215 | >1500 | | Pass |
| 4 | D | L | — | 109 | >1500 | | — |
| 5 | D | M | 8 | 40 | 10 | P | Pass |
| 6 | E | L | — | 10,000+ | >1500 | | — |
| 7 | E | M | 33 | >350 | 500 | P | Fail |
| 8 | E | N | 28 | 590 | >1500 | | — |
| 9 | F | K | 294 | 468 | >1500 | | Fail |
| 10 | G | K | >425 | 670 | >1500 | | Pass |
| 11 | G* | K | 40 | 43 | >1500 | | — |
| Comparison 4 | H | K | 0.2 | 1.0 | 0.3 | C | — |
| Comparison 5 | I | K | 0.1 | 0.1 | 0.1 | C | — |
| Comparison 6 | NR | M | <0.1 | — | 0 | P | — |
| Comparison 7 | SRB | M | 3.2 | — | <0.3 | P | — |

*Coated from 50% toluene solution, whereas all other base coats were applied as 100% solids.

A study of Table III shows that tapes 1–11 are all satisfactory for many general purpose uses. Some tapes (notably those of Examples 2, 3, 5 and 10) not only have extended utility but also strip cleanly away from painted panels after exposure to high temperatures. Other tapes listed in Table III which failed the removability test, did so because of inadequate bonding of the pressure-sensitive adhesive to the polyurethane layer. Such tapes can be rendered satisfactory with respect to paint panel removability of treating the polyurethane with a suitable primer before applying the pressure-sensitive adhesive coating, thereby inhibiting adhesive transfer. To illustrate, the tape of Example 1 passes the paint panel removability test if a thin primer coating of acidic acrylate copolymer adhesive is applied to the polyurethane before applying the pressure-sensitive adhesive. One suitable primer is a 94.5:5.5 isooctyl acrylate:acrylic acid copolymer.

When the present invention is utilized in the manufacture of adhesive transfer tapes, the polyurethane layer is sandwiched between two functional adhesive layers. As with masking tape products, the thickness of the polyurethane layer should be at least twice, and preferably at least four times, as thick as each functional adhesive layer, the requisite overall thickness of the three layers being greater where rough substrates are to be joined than where smooth substrates are to be joined.

Application of the principles of the invention to adhesive transfer tape manufacture is further clarified by means of the following example.

EXAMPLE 12

Polyurethane formulation C was allowed to prereact at room temperature to increase its viscosity. The prereacted mixture was then knife-coated onto the surface of a 250-micrometer polytetrafluoroethylene (PTFE) film and cured at 150° C. for 90 seconds, leaving a 100-micrometer thick polyurethane layer. The polyurethane surface was then knife-coated with an aqueous emulsion of pressure-sensitive adhesive (psa) K and dried 2 minutes at 105°–110° C. to leave an adhesive thickness of about 6 micrometers.

Next, the PTFE film was stripped away, and the adhesive surface laminated to a 38-micrometer biaxially oriented polyethylene terephthalate (PET) film, the resultant laminates being placed in a 150° C. oven for 3 minutes to improve bonding between the psa and the PET film. The newly exposed surface of the polyurethane layer was then coated with an aqueous emulsion of adhesive K and again dried 2 minutes at 105°–110° C. In the resultant product a 100-micrometer polyurethane layer was sandwiched between two 6-micrometer layers of psa, one of which was firmly bonded to a PET film.

For comparative purposes, separate 100-micrometer layers of (a) polyurethane C and (b) pressure-sensitive adhesive K were formed on PTFE film liner, a 4-micrometer primer coating of 94.5:5.5 isooctyl acrylate:acrylic acid copolymer being applied to the PTFE in the latter case to ensure wetting. These layers were then transferred to PET film in the same manner as the product of this Example 12.

The product of this Example 12, as well as those of the two comparative examples (respectively identified as Comparison Examples 8 and 9), was then subjected to the shear test previously described, except that the weight applied was 500 grams. In addition to the stainless steel substrate, however, tests were also performed on an anodized aluminum substrate. Results are tabulated below:

| Example | Adhesive Construction | Shear, Minutes, on Substrate Indicated Stainless Steel | Shear, Minutes, on Substrate Indicated Anodized Aluminum |
|---|---|---|---|
| 12 | psa:polyurethane:psa | 235 | 1,417 |
| Comparison 8 | polyurethane | 2.8 | >1,000 |
| Comparison 9 | psa | 157 | 167 |

Comparison Example 8 demonstrates that although the polyurethane adheres poorly to stainless steel (failure occurred between the polyurethane and the panel), it bonds firmly to anodized aluminum. Polyurethane, as previously shown in Table I, lacks the ability to function for general purpose use.

In Comparison Example 9, the end point was marked by cohesive failure of the psa.

The product of Example 12 was significantly better than the products of either Comparison Example 8 or Comparison Example 9. In all cases, the ultimate failure of Example 12 was in adhesion of the panel-contacting psa to the polyurethane. As has been indicated, the time to failure could be extended by the judicious application of a primer to the polyurethane surface prior to coating with psa.

What is claimed is as follows:

1. Normally tacky and pressure-sensitive adhesive tape having good holding power, resistance to aging and comparatively low cost comprising a sheet backing bearing a composite adhesive stratum comprising a layer of rubbery, compliant polyurethane, and, bonded over the polyurethane layer so as to constitute the outermost surface, a layer of soft, normally tacky and pressure-sensitive adhesive which is immiscible with the polyurethane, the thickness of the polyurethane layer being at least about twice the thickness of the pressure-sensitive adhesive layer, the polyurethane having a 10-second shear-creep compliance of at least $5 \times 10^{-6}$ cm$^2$/dyne, a 7-10 minute shear rate viscosity of at least $10^6$ Pa.s, a 7-10 minute delayed elastic compliance component greater than 50%, and an equilibrium elastic compliance greater than 90%, and the pressure-sensitive adhesive having a 10-second shear creep compliance component of at least $1.5 \times 10^{-6}$ cm$^2$/dyne, a 7-10 minute shear rate viscosity of at least $3 \times 10^6$ Pa.s, and a 7-10 minute delayed elastic compliance component greater than 50%, said tape exhibiting superior adhesive properties to those attainable with tape in which the backing is coated with either the polyurethane alone or the pressure-sensitive adhesive alone.

2. The tape of claim 1 wherein the thickness of the polyurethane layer is at least four times the thickness of each pressure-sensitive adhesive layer.

3. The tape of claim 1 or 2 wherein the polyurethane layer is in direct contact with and firmly bonded to the sheet backing.

4. The tape of claim 1 or 2 wherein a thin primer layer is interposed between the polyurethane layer and the pressure-sensitive adhesive.

5. The tape of claim 1 or 2 wherein (a) the sheet backing is a release liner and (b) a layer of soft, normally tacky and pressure-sensitive adhesive is interposed between the liner and the polyurethane layer, thereby providing a relatively inexpensive adhesive transfer tape having excellent holding power and shear properties.

6. The tape of claim 1 or 2 wherein the backing is a saturated crepe paper.

7. The tape of claim 1 or 2 wherein the backing is biaxially oriented polyethylene terephthalate.

* * * * *